July 1, 1952 C. V. LITTON Re. 23,517

ADJUSTABLE MAGNETRON

Original Filed Nov. 1, 1945 3 Sheets-Sheet 1

INVENTOR
CHARLES V. LITTON
BY Edward H. Rainey
ATTORNEY

ADJUSTABLE MAGNETRON

Original Filed Nov. 1, 1945 3 Sheets-Sheet 2

INVENTOR
CHARLES V. LITTON
BY Edward A. Kenney
ATTORNEY

July 1, 1952 C. V. LITTON Re. 23,517

ADJUSTABLE MAGNETRON

Original Filed Nov. 1, 1945 3 Sheets-Sheet 3

INVENTOR
CHARLES V. LITTON
BY
Edward S. Rhuning
ATTORNEY

Reissued July 1, 1952 Re. 23,517

UNITED STATES PATENT OFFICE 23,517

ADJUSTABLE MAGNETRON

Charles V. Litton, Redwood City, Calif.

Original No. 2,512,901, dated June 27, 1950, Serial No. 626,130, November 1, 1945. Application for reissue January 22, 1951, Serial No. 207,645

22 Claims. (Cl. 315—40)

Matter enclosed in heavy brackets [ ] appears in the original patent but forms no part of this reissue specification; matter printed in italics indicates the additions made by reissue.

This invention relates to magnetrons and in particular to magnetrons of the plural cavity resonator type. More specifically the invention provides an improved mechanical structure whereby the operating frequency of the magnetron may be varied over a considerable range in a positive and reliable manner.

In their origin plural cavity magnetrons were of a fixed frequency type, i. e., they were constructed without the benefit of adjustable electrodes whereby the electrical constants of the cavities could be varied to change their frequencies of operation. The theory of operation of cavity magnetrons is well known to those skilled in the art and the theory will not be repeated here except to note that the frequency of operation is determined by the electrical constants of the cavities, the latter usually being dimensioned so that they oscillate substantially at half wavelength lines.

More recently cavity magnetrons have been developed in which the electrical constants of the cavities may be changed thereby permitting the magnetrons to be operated over a range of frequencies. Change in frequency is preferably accomplished by moving a low loss conducting element relative to the region of electromagnetic field concentration in the half wave length resonant cavity. The counterelectromotive forces set up in the conducting element produce a field which is opposed to the original field thereby reducing the total field. The inductive property of the resonant cavity is thereby reduced and the frequency thereof is increased. Similarly, a second conducting element may be positioned so that it may be moved relative to the region of electro-static field concentration, this region being near the open end of the cavity. When this second conducting element is positioned between the fixed ends of the cavity the electrostatic field is increased due to the increase in capacitance. This results in a reduced frequency.

Preferably, and in accordance with my invention, I so construct the two above mentioned conducting elements that they form a unitary all metallic structure, the two elements being positioned on a plurality of guide rods, the latter being journaled in suitable bearings by which the rods may be moved relative to the cavity as will be clearly explained hereinafter. It is to be understood that each cavity of the magnetron has its own set of tuning elements and that all said tuning elements comprise the unitary tuning structure. Among the objects and features of my invention are means to provide:

1. An improved mechanical arrangement for adjusting the frequency to which a magnetron may be tuned.

2. An arrangement of guides for constraining the motion of the tuning elements of an adjustable magnetron.

3. A guide rod and bearing arrangement for the tuning elements of an adjustable magnetron which will not become misaligned when subjected to the heat of operation of the magnetron.

4. The above three enumerated objects in combination with means for preventing the magnetron from oscillating on undesired modes.

Other objects and features of my invention will be apparent from the following description and the appended claims.

A preferred embodiment of my invention is illustrated in the attached drawings of which:

Fig. 1 is a cross-sectional view of a plural cavity magnetron, the section being taken through what is essentially the axis of symmetry and showing the tuning elements mounted on their guiding structure and the mechanism for adjusting same to the desired position. The section also shows the method of mounting the cathode of the magnetron and the means for extracting the high frequency energy from the resonating cavities.

Figure 1:
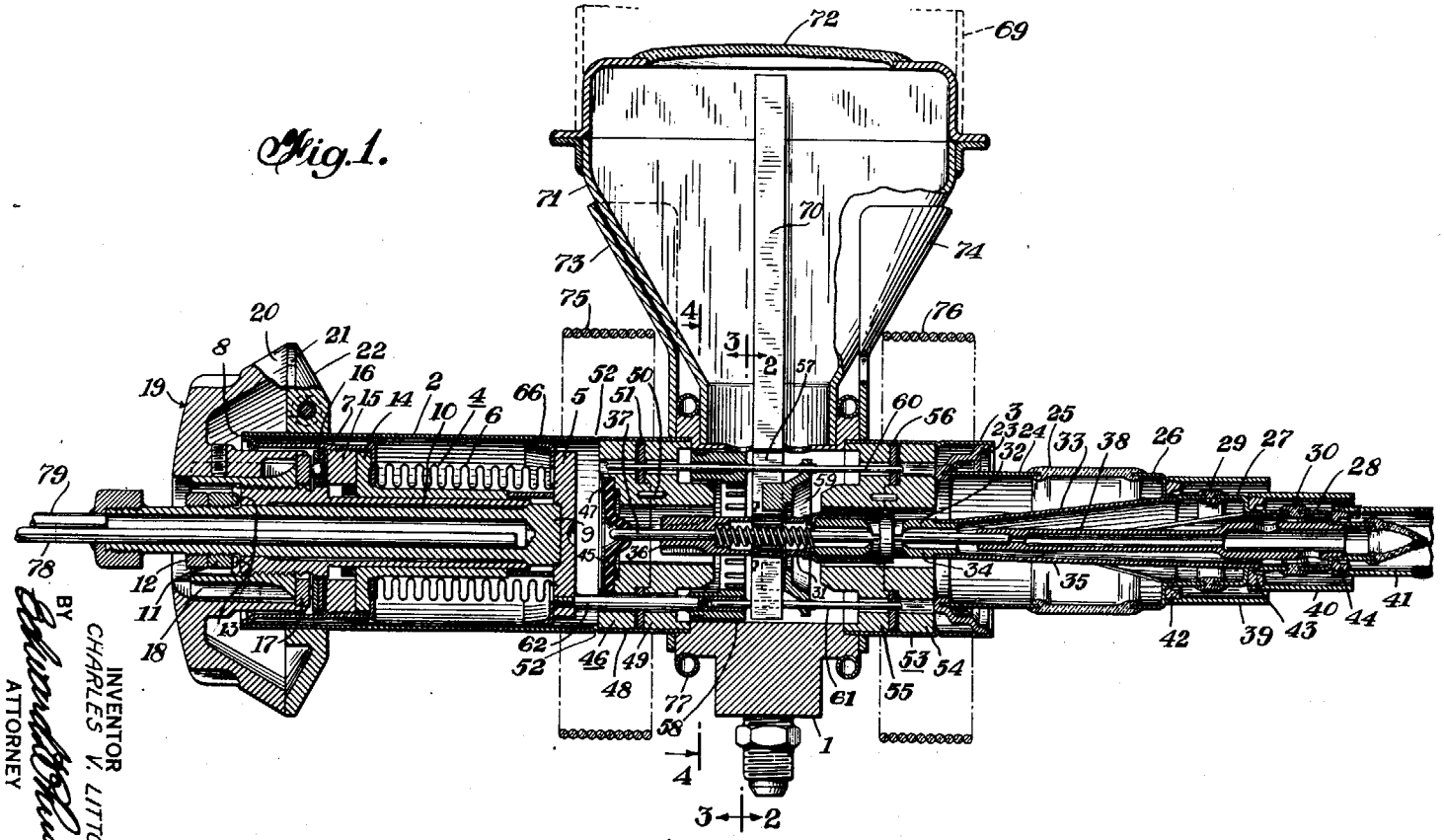

Referring to the figures the reference character 1 represents the body of the magnetron to which other parts are brazed or otherwise suitably fastened to form a structure capable of being evacuated. On one side of the body is a cylindrical extension 2 while on the other side there is a similar but shorter cylindrical extension 3, both extensions being brazed to the body 1.

The extension or housing 2 encloses an assembly 4 for adjusting the frequency to which the magnetron may be tuned as will be hereinafter described. This adjusting mechanism does not constitute a part of my present invention and a detailed description will therefore not be given. However in general, a platform 5 is brazed to a Sylphon bellows 6 which is in turn brazed to a bearing holder 7, the latter being brazed to the housing 2 along the circumference 8. When the magnetron is evacuated, the external atmospheric pressure tends to extend the bellows and force the platform 5 inwardly. This tendency must be constrained and a method for accomplishing same will now be described. A rod 9 is brazed to the platform 5 and extends through the bellows and the bearing holder. A hardened and ground sleeve 10 is held in position over the rod by the tongue nut 11 and the lock nut 12. The tongues 13 fit into slots in the sleeve 10. When the nuts are tightened this prevents any relative motion between the rod and the sleeve. A bearing 14 is positioned over the sleeve 10 and is clamped against the bottom of the bearing holder 7 by the inner ball race 15. The thrust bearing ball retainer with balls 16 and the outer ball race 17 are held against the race 15 by atmospheric pressure and the nut 18, the latter bearing against the race 17. Relative rotation between the nut 18 and the sleeve 10 determines the extent of the longitudinal motion of the platform 5. A control knob 19 is fastened to the nut 18 for turning the latter. A scale 20 is provided on the outer diameter of the knob and is aligned adjacent a fixed scale 21 on an indicator ring 22, the latter being clamped to the extension 2 as shown. A measure of the longitudinal motion is thus obtained.

On the aforementioned cylindrical extension 3 is mounted the cathode support assembly. Since this assembly is not part of my present invention, but is described and claimed in a separate application, Serial Number 626,132, entitled "Cathode Support" and filed November 1, 1945, which is now United States Patent 2,474,263, issued June 28, 1949. It will only be briefly described here. A support cup 23 is brazed to the extension 3 and to a tubular sealing member 24. This member and the other members which are part of the metal to glass seals for insulating the cathode supporting members one from another is preferably made of "Kovar" or other suitable material. Sealed to the member 24 is an insulating portion 25 followed by a series of three metal cups 26, 27, and 28 separated by glass portions 29 and 30. To the metal cups are attached the supporting members for the cathode 31. The cathode comprises two filament windings preferably of thoriated tungsten, so mounted and energized as to constitute a bifilar filament. In a bifilar filament the current in adjacent turns flows in opposite directions with the result that the magnetic field due to the current is substantially neutralized. If alternating current is employed to energize the filament as is usually the case in practice, the small amount of any residual alternating flux is insufficient to appreciably modulate the magnetron output current. One end of one filament is connected to a semi-cylindrical member 32 which is in turn fastened to a conical or other conoidal shaped support 33, the latter being brazed to the metal cup 26. One end of the other filament winding is connected in a similar manner through another semi-cylindrical sleeve member 34, and conical support 35 to metal cup 27. The other ends of each filament are connected to a member 36 which in turn is brazed to a rod 37, the latter being brazed to the central support 38. Power for energizing the cathode may be applied as required by connecting the power supply leads to the terminals 39, 40, and 41, these terminals being screwed onto threaded rings 42, 43, and 44 respectively. The rings are brazed to the metal cups 26, 27 and 28 thus insuring good electrical connections throughout.

The above described cathode support assembly is one of great rigidity. However, if still greater rigidity and freedom from possible vibration is required the rod 37 may be extended and inserted into a bearing in an insulating support ring 45 which may be held within the pole piece 46 by welding a ring 47 to the pole piece as shown.

The pole piece 46 is actually made in two parts 48 and 49 and held in alignment by the dowel pin 50. Between the two parts is a guide ring 51 having a plurality of holes therein which act as guides for the tuning structure and together with said tuning structure forms one of the features of my invention. The pole piece 46 is firmly held in place with the extension 2 by crimping the latter against the pole piece at a plurality of points 52.

Similarly the pole piece 53 is divided into two parts 54 and 55. Between these parts is positioned a second guide ring 56 also having a plurality of guide holes therein. Pole piece 53 is held in position within the extension 3 by the support cup 23 as shown. The two guide rings 51 and 56 are not clamped between their respective pole pieces but are free to expand under the heat of operation of the magnetron. This prevents any binding action which might otherwise occur.

Figure 2:
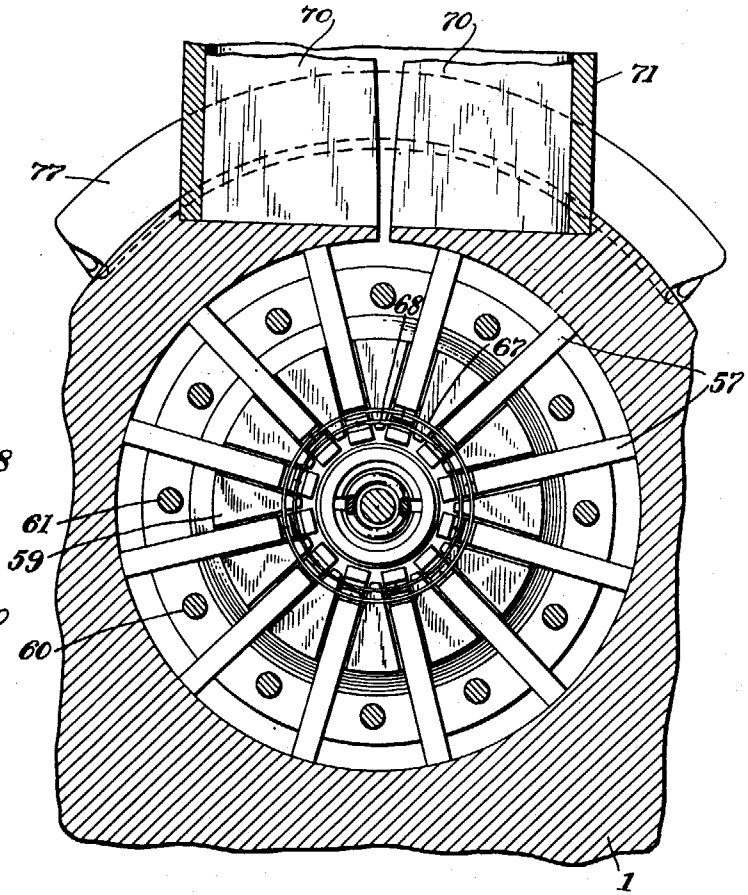
Fig. 2 is a partial view looking toward the plane perpendicular to the axis of symmetry at the section 2—2 of Fig. 1. The figure shows essentially the construction and positioning of the capacitance varying elements or C-ring.

I have illustrated my invention as applied to a twelve cavity magnetron although it may be applied to a magnetron having any number of cavities or to any tube structure or electron discharge device requiring similar operating features. Referring to Fig. 2, I have shown a view of the magnetron looking toward a plane passing perpendicular through the axis of symmetry and showing the twelve cavities and the C-ring or capacitance varying element. The twelve cavities are formed by brazing a plurality of vanes 57 around the inner diameter of the body 1 as shown. Each cavity constitutes in effect a quarter wave line which, when resonating, has a magnetic flux concentration adjacent its shorted end, the short being the inner wall of the body 1. This is the region of high current density as is well known. Between the inner surfaces of the vanes is the region of maximum concentration of electric flux, this being point of maximum alternating potential difference.

Figure 3:
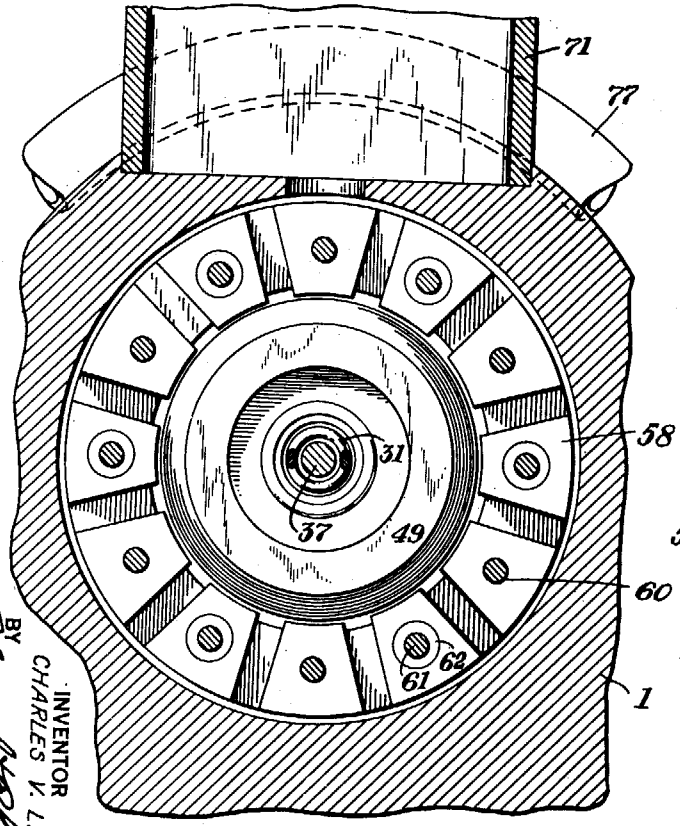
Fig. 3 is a partial sectional view looking toward the plane perpendicular to the axis of symmetry at the section 3—3 of Fig. 1. The figure shows the construction and positioning of the inductance varying elements or L-ring.

In order to change the resonant frequency of the magnetron two means are provided, one, an L-ring 58 (shown in Fig. 3), the other, a C-ring 59 (shown in Fig. 2). The L-ring comprises a plurality of metal or conducting elements preferably formed by milling out slots in a solid metal piece whereby a unitary structure is obtained. The conducting elements are of a size such that they may freely enter and egress the cavities in the region of magnetic flux concentration. As the elements enter this region the effective inductance of the cavities is decreased and the cavities become resonant at a higher frequency.

The C-ring also comprises a plurality of conducting elements formed in a manner similar to that of the L-ring. The dimensions and size of these elements, however, are such that they may freely enter or egress the cavities in the region of maximum electric flux concentration. As the elements of the C-ring enter this region the effective capacitance of the cavities is increased and the cavities become resonant at a lower frequency. Claims directed to my improved method of varying the effective capacitance of magnetron resonant cavities are contained in a separate application, Serial Number 626,131, entitled "Reactance Tuning Device" and filed November 1, 1945, which is now U. S. Patent No. 2,495,744, granted January 31, 1950.

In accordance with my invention the L-ring and the C-ring are mounted on a plurality of metal guide rods 60 and 61 so that together with the latter a unitary metallic or conducting structure is formed. The L-ring and the C-ring are positioned in general on opposite sides of the resonant cavities in a manner such that as one ring enters the cavities the other ring emerges therefrom. This provides a more uniform variation of frequency with respect to the rectilinear motion of the rings and also permits of a greater range of frequencies with a smaller motion.

As shown in Fig. 1, the guide rods 60 are somewhat longer than guide rods 61. The rods of the two groups alternate around the L-ring and C-ring structures. It will be seen that the longer rods 60 extend a considerable distance beyond both sides of ring structures and pass through and are journaled in the guide holes of the guide rings 51 and 56. The shorter rods 61 extend only to one side of the C-ring structure and are journaled in only one guide ring. On the other side, the guide rods 61 are fastened into larger rods 62, the latter being fastened to both the L-ring 58 and the platform 5. Thus it will be seen that a motion of the platform is transmitted to the L-ring and C-ring structure whereby an adjustment or tuning of the cavities is accomplished. By employing a plurality of small guide rods and bearings arranged on a circle having a diameter relatively great with respect to the diameters of the rods, the tendency for the mechanism to bind is substantially eliminated. It has also been found that the above described guiding arrangement as applied to the movable elements of a magnetron has resulted in a lesser tendency for the magnetron to operate parasitically or on undesired modes.

The guide rods 60 and 61 are preferably made of tungsten while the guide rings may be made of copper. It has been found that the combination of tungsten and copper makes a very good bearing which will stand up under the high temperatures and other conditions encountered in vacuum at high frequencies. This is the result of the fact that tungsten is a refractory metallic material and copper is a non-refractory metallic material; i. e. the former is especially resistant to the action of heat and the latter is not.

Figure 4:
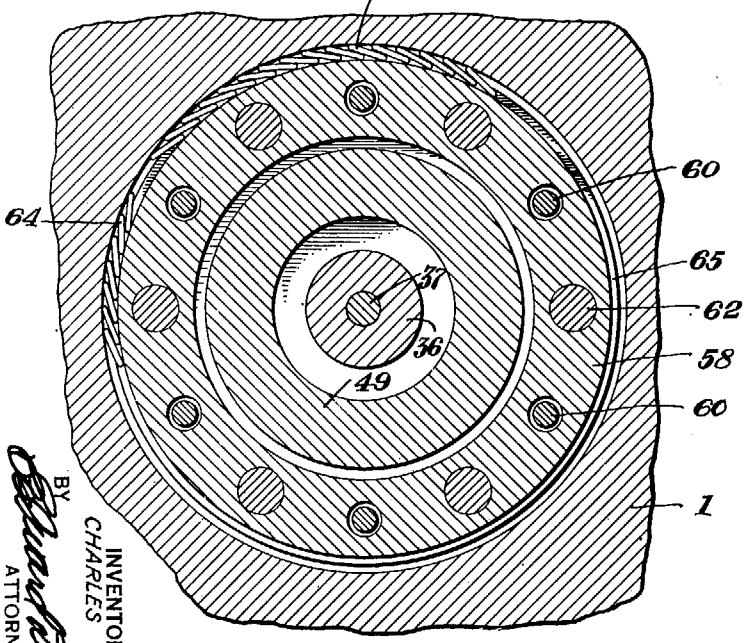
Fig. 4 is a partial sectional view showing the method of grounding the L-ring to the main body of the magnetron. The view is taken looking toward the plane of the section 4—4 of Fig. 1.

As a means for preventing the magnetron from oscillating on undesired modes, i. e., modes other than the one determined by the dimensions of the cavities, the L-ring is grounded directly to the main body of the magnetron by an even number of coiled springs 63 and 64 as shown in detail in Fig. 4, this figure being a view 4—4 taken through the plane of the springs as shown in Fig. 1. A groove 65 in the periphery of the L-ring has a depth such that in order for the turns of the springs to lie in the groove they must be compressed sidewise in echelon fashion as shown. A spring compressed in this manner is much more resilient than if it were compressed across its diameter with the result that the L-ring is uniformly grounded and yet may be easily moved relative the cavities with no tendency toward binding. By making the coiled grounding springs equal in number (two being partially illustrated in Fig. 4) and so compressing them that the coils are inclined in opposite directions around the L-ring, a possible tendency for the springs to produce a rotational movement of the L-ring is obviated since all tangential forces are balanced. The grounding of the L-ring is effective in restricting the overall active dimensions of the L-ring and as above stated tends to prevent oscillations on undesired modes.

To further prevent undesired modes of oscillation a member 66 is fastened to the platform 5 in a manner such that a substantial capacitance exists between the member 66 and the grounded extension 2. At the high frequencies of operation the capacitance effectively short circuits the platform 5 to ground.

As is well known when the magnetron is in operation the instantaneous oscillating potentials on the adjacent vanes which form the cavities are equal and opposite. In other words the currents in adjacent cavities are of opposite phase. The current in alternate cavities are therefore in like phase. To closely couple the alternate cavities together and to force them to oscillate in effect as a single cavity, the alternate vanes are fastened together in a known manner by straps 67 and 68 as shown in Figs. 1 and 2.

Oscillatory energy from the cavities of the magnetron is extracted for useful work by coupling a wave guide 69 to one of the cavities through an impedance transformer. The transformer comprises a pair of ramps 70 positioned within a horn shaped member 71. Adjacent the cavities the ramps are close together and therefore of low impedance to substantially match the impedance of the cavities. The ramps diverge outwardly and as they approach the wave guide 69, their separation and the internal dimensions of the horn determines their impedance which is designed to substantially match that of the wave guide.

Although the impedance transformer is apparently coupled to only one cavity, the fact that alternate vanes are strapped together results in the transformer being actually closely coupled to all cavities which as aforesaid oscillate as a unit.

In order that the magnetron may be evacuated and still transmit wave energy from the impedance transformer into the wave guide an insulating window 72 is sealed over the outer end of the horn 71. The window is preferably elliptical in shape and so dimensioned that at approximately the mean frequency to which the magnetron may be tuned it represents a substantially infinite impedance across the wave guide and therefore does not appreciably influence the operation of the magnetron.

It has been found that during magnetron oscillation there are occasions when free electrons apparently escape from the cavity of the magnetron to the space within the horn 71. If these electrons strike the window with sufficient velocity, the window becomes heated and failure due to suck-in will occur. In order to prevent such failures, two magnetic shoes 73 and 74 are positioned one on each side of the horn 71 as shown in Fig. 1. The magnetic field which is essential to magnetron operation is produced by field coils 75 and 76 shown schematically in Fig. 1. The above mentioned magnetic shoes are so positioned with respect to the field poles and field coils of the magnetron that a deflecting field is produced across the shoes substantially at right angles to the paths of the free electrons. The field deflects the electrons causing them to impinge on the inner walls of the horn where their energy is harmlessly dissipated. This feature of deflecting the free electrons (or possible positive ions) away from the window by means of the magnetic shoes is claimed in a separate application, Serial Number 626,133, entitled "Protective Means for Electron Discharge Device" and filed November 1, 1945, which is now United States Patent 2,477,633 issued August 2, 1949.

The elements of the magnetron which carry the oscillatory currents may be made of copper if moderate powers are to be generated. However, greater powers may be generated by employing elements made of tungsten or other highly refractory metal.

The magnetron is preferably liquid cooled and this has been illustrated by the tubing 77 through which a coolant flows. The control assembly 4 may also be liquid cooled as shown by the inlet and outlet tubings 78 and 79 respectively positioned in the central hollow portion of the rod 9.

Although I have illustrated only a single embodiment of my invention other modifications will be apparent to one skilled in the art and it is my intention that the scope of my invention be limited only by the objects thereof and the appended claims.

What is claimed is:

1. An adjustable magnetron comprising a supporting body, a plurality of vanes mounted inside said body integrally therewith, the size and position of said vanes forming together with said body a plurality of resonators and determining substantially a mean frequency to which the magnetron may be tuned, magnetic pole pieces mounted inside said supporting body and positioned on oppostie sides of said resonators, a guide ring concentrically mounted on each pole piece, a plurality of guide rods journaled in said guide rings, an L-ring and a C-ring fixedly mounted on said rods and having tuning portions positioned to enter into or egress from said resonators when said guide rods are moved longitudinally, and means connected between said body and said rods for producing said longitudinal motion to vary the tuning of said magnetron.

2. An adjustable magnetron in accordance with claim 1 wherein each of said pole pieces are divided into two parts and said guide ring is mounted between said parts.

3. The adjustable magnetron of claim 1 wherein the mounting of said guide rings on said pole pieces permits free radical motion of said guide rings.

4. An adjustable magnetron according to claim 1 in combination with means for grounding at least one of said rings directly to said body, said grounding means comprising a coiled spring positioned between said one of said rings and said body.

5. An adjustable magnetron according to claim 1 in combination with means for grounding at least one of said rings directly to said body, said means comprising an even number of coiled springs positioned between said one of said rings and said body, the turns of said springs being compressed sidewise in echelon fashion.

6. An electron discharge device comprising an envelope, a plurality of cavity resonators inside said envelope, means in said resonators in the regions at which a strong electromagnetic field develops during operation for varying the frequency of said resonators, a plurality of guiding elements upon which said frequency varying means are mounted, said guiding element being mounted on said envelope on opposite sides of said resonators, and means between said envelope and said guiding elements for constraining the motion of said guiding elements.

7. An electron discharge device according to claim 6 in which said frequency varying means comprises a first plurality of metallic elements mounted on said guiding means at positions adjacent regions in said resonators at which a strong concentration of electric flux develops during operation for varying the effective capacities of said cavity resonators and a second plurality of metallic elements mounted on said guiding elements at positions adjacent regions in said resonators at which a strong concentration of magnetic flux develops during operation for varying the effective inductance of said cavity resonators.

8. In combination, a cavity resonator for sustaining ultra high frequency oscillations, said resonator having a region in which magnetic flux concentrates during operation and a region in which electric flux concentrates during operation, and means for varying the relative values of said concentrations comprising a movable unitary metallic member passing between the sides of said resonator and mounted on opposite sides of said resonator, said member having a portion mounted adjacent the region of magnetic flux concentration and another portion mounted adjacent the region of electric flux concentration, said portions being adapted respectively to enter into and egress from said regions simultaneously or vice versa.

9. An electron discharge device comprising an envelope, a plurality of cavity resonators inside said envelope, means in said resonators in the regions at which a strong electromagnetic field develops during operation for varying the frequency of said resonators, a plurality of guiding elements upon which said frequency varying means are mounted, said guiding elements being mounted in said envelope on opposite sides of said resonators, means mounted between said envelope and said guiding elements for constraining the motion of said guiding elements, said last-mentioned means comprising two groups of elements having bearing surfaces.

10. An electron discharge device according to claim 9 in which said frequency varying means comprises a plurality of metallic elements mounted on said guiding elements at positions adjacent regions in said resonators at which a strong concentration of electric flux develops during operation.

11. An adjustable magnetron comprising a supporting body, a plurality of vanes mounted inside said body integrally therewith, the size and position of said vanes forming together with said body a plurality of cavity resonators and determining substantially a mean frequency to which the magnetron may be tuned, a guide ring mounted inside and on said body, a plurality of guide rods journaled in said guide rings, an L-ring and a C-ring fixedly mounted on said rods and having tuning portions to enter into and egress from said cavities when said guide rods are moved longitudinally and means connected to said rods for producing said longitudinal motion to vary the tuning of said magnetron.

12. A magnetron of the type capable of being continuously tuned through a range of frequencies comprising a cylindrical supporting body, a plurality of vanes positioned in a plane transverse to the center axis of the body and radially disposed about said axis, the size and spacing of said vanes forming together with said body a plurality of resonant cavities and determining substantially a mean frequency about which the frequency of said magnetron may be tuned, a plurality of guiding rings positioned on each side of said plane of vanes and mounted on said supporting body, a plurality of guide rods mounted freely in said guiding rings so that their free movement is permitted over a limited range, means in said resonators in the region at which a strong concentration of electric flux develops during operation for varying the capacitance of said resonators, means in said resonators in the region at which a strong concentration of electric flux develops during operation for varying the inductance of said resonators, said capacitance and inductance varying means being mounted on said guide rods, and means mounted between said supporting body and said guide rods for varying the position of said capacitance and inductance varying means relative to said resonators.

13. A magnetron according to claim 12 in which said plurality of guiding means comprise bearing surfaces through which said guide rods are journaled.

14. A vacuum device comprising an evacuated envelope, a plurality of elements mounted in a high temperature zone within said envelope, said elements being capable of relative motion one with respect to the other, and means also within said envelope for constraining said motion between said elements comprising a tungsten rod extending through said zone and journaled on a copper bearing surface disposed outside said zone.

15. A vacuum device comprising an evacuated envelope, a plurality of elements mounted within said envelope, said elements being capable of relative motion one with respect to the other, and means for constraining said motion comprising a plurality of rods mounted in a substantially circular arrangement on one of said elements, said rods being journaled in bearings in another of said elements.

16. A vacuum tube assembly comprising a plurality of cavity resonators, reactance varying elements for varying the frequency of said resonators, guiding means on which said elements are so mounted that they enter into or egress from said resonators, said guiding means comprising at least two journaled bearing surfaces, one mounted on each side of said plurality of cavity resonators.

17. A tunable magnetron comprising a metallic envelope, a plurality of cavity resonators mounted inside and on said envelope, a plunger adjustably mounted on said envelope at a position adjacent a predetermined region in said resonators for varying the resonant frequency thereof, and means mounted between said plunger and said envelope for making an electrical connection therebetween, said means comprising coiled springs arranged to be compressed sidewise in echelon fashion for making resilient connection therebetween whereby said plunger may be moved with respect to said envelope and said connection will be assured.

18. A tuning mechanism for a magnetron comprising a plurality of cavity resonators, plungers in regions of said resonators at which a strong concentration of magnetic flux develops during operation, further plungers in other regions of said resonators at which a strong concentration of electric flux develops during operation, said plungers being mounted on opposite sides of said resonators, and an adjustable member mechanically connected to said plungers for moving said plungers into and out of said resonators for simultaneously varying the inductance of said resonators at said first mentioned regions and the capacitance of said resonators at said other regions whereby the resonant frequency of said magnetron is varied.

*19. A tunable electron-discharge device comprising: a cathode; an anode structure, provided with a plurality of anode members, spaced from said cathode; each pair of adjacent anode members, together with that portion of said anode structure lying therebetween, defining a cavity resonator; and means supported adjacent said cavity resonators and movable with respect thereto, for simultaneously altering the distributed capacitance and inductance thereof in the same direction; said last-named means including a plurality of conducting members each of which is movable intermediate a pair of adjacent anode members to increase the capacitance existing therebetween, and a plurality of additional conducting members each of which is movable intermediate a pair of adjacent anode members to decrease the existing inductance thereof; said first and second named conducting members lying in planes parallel to the longitudinal axes of said cavity resonators and being completely off-set with respect to each other.*

*20. A tunable electron-discharge device comprising; a cathode; an anode structure, provided with a plurality of anode members, spaced from said cathode; each pair of adjacent members, together with that portion of said anode structure lying therebetween, defining a cavity resonator; and a pair of rigidly connected means, supported adjacent said cavity resonators and simultaneously movable in opposite directions with respect thereto, for simultaneously altering the distributed capacitance and inductance thereof in the same direction; said last-named means including, respectively, a plurality of conducting members each of which is movable intermediate a pair of adjacent anode members to increase the capacitance existing therebetween, and a plurality of additional conducting members each of which is movable intermediate a pair of adjacent anode members to decrease the existing inductance thereof; said first and second named conducting members lying in planes parallel to the longitudinal axes of said cavity resonators and being completely offset with respect to each other.*

*21. A tunable electron-discharge device comprising: a cathode; an anode structure, provided with a plurality of anode members, spaced from said cathode; each pair of adjacent anode members, together with that portion of said anode structure lying therebetween, defining a cavity resonator; and means supported adjacent said cavity resonators and movable with respect thereto, for simultaneously altering the distributed capacitance and inductance thereof in the same direction; said last named means including a substantially cup-shaped conducting member having a plurality of elements depending therefrom, each of which is movable intermediate a pair of anode members to decrease the existing inductance thereof; and a plurality of additional elements depending from said first-named elements, each of which is movable intermediate a pair of adjacent anode members to increase the capacitance existing therebetween; said first and second named elements lying in planes parallel*

*to the longitudinal axes of said cavity resonators and being completely offset with respect to each other.*

*22. A tunable electron-discharge device comprising: a cathode; an anode structure, provided with a plurality of anode members, spaced from said cathode; each pair of adjacent anode members, together with that portion of said anode structure lying therebetween, defining a cavity resonator; and means supported adjacent said cavity resonators and movable with respect thereto, for simultaneously altering the distributed capacitance and inductance thereof in the same direction; said last named means including a first plurality of members each movable intermediate a pair of anode members to decrease the inductance thereof; a second plurality of members fixedly secured to said first plurality of members, each movable intermediate said anode members to increase the capacitance existing therebetween, a movable supporting member and*

*means for securing one of said plurality of members to said supporting members; said first and second members lying in planes parallel to the longitudinal axes of said cavity resonators and being offset with respect to each other.*

CHARLES V. LITTON.

REFERENCES CITED

The following references are of record in the file of this patent or the original patent:

UNITED STATES PATENTS

| Number | Name | Date |
|---|---|---|
| 2,078,672 | Knowles | Apr. 27, 1937 |
| 2,408,234 | Spencer | Sept. 24, 1946 |
| 2,422,465 | Bondley | June 17, 1947 |
| 2,481,171 | Spencer | Sept. 6, 1949 |
| 2,496,887 | Nelson | Feb. 7, 1950 |
| 2,501,196 | Spencer | Mar. 21, 1950 |
| 2,527,699 | Bowen et al. | Oct. 31, 1950 |